United States Patent [19]
Tamura

[11] Patent Number: 5,943,141
[45] Date of Patent: Aug. 24, 1999

[54] IMAGE READING APPARATUS HAVING SHADING CORRECTION MEANS USING A REFERENCE DATA PROCESSING CIRCUIT

[75] Inventor: Ryuta Tamura, Osaka, Japan

[73] Assignee: Mita Industrial Co., Ltd., Osaka-fu, Japan

[21] Appl. No.: 08/974,868

[22] Filed: Nov. 20, 1997

[30] Foreign Application Priority Data

Nov. 29, 1996 [JP] Japan ..................................... 8-319491

[51] Int. Cl.[6] .............................. H04N 1/40; G06K 9/40
[52] U.S. Cl. ........................................... 358/461; 382/274
[58] Field of Search .................................. 358/474, 461; 382/274; 348/251; 345/426

[56] References Cited

U.S. PATENT DOCUMENTS

| | | | |
|---|---|---|---|
| 5,146,351 | 9/1992 | Maehara | 358/461 |
| 5,181,118 | 1/1993 | Kimura | 358/461 |
| 5,455,690 | 10/1995 | Ishikawa | 358/461 |
| 5,644,409 | 7/1997 | Irie et al. | 358/461 |
| 5,717,790 | 2/1998 | Kanesaka et al. | 382/274 |

*Primary Examiner*—Joseph Mancuso
*Assistant Examiner*—Hien Truong
*Attorney, Agent, or Firm*—Jordan and Hamburg LLP

[57] ABSTRACT

This invention is related to an image reading apparatus for use in a digital copy machine and a facsimile machine. The invention is made possible to obtain the simple flat average value of the white reference data used for a shading correction obtained with a photoelectric conversion elements arranged in a line by sensing the reflected light upon a white reference plate. The image reading apparatus comprises an n-bit memory for the white reference data and another n-bit memory for the black reference data and a reference data processing circuit for summing white reference data after $2^m$ times of line readings on the white reference plate. The summation of the data is carried out with the use of an n+m bit memory region, consisting of an upper n bit section and a lower m bit section, that is made up with the n-bits of the n-bit memory of the white reference data and m-bits of the n-bit memory of the black reference data. Then after summation of $2^m$ data is completed, the data stored in the upper n-bit region of the (n+m) bit memory region coincides with $\frac{1}{2}^m \times$(summation of the $2^m$ white reference data), that is in fact a simple average value of the summed up data.

8 Claims, 11 Drawing Sheets

IMAGE READING APPARATUS HAVING SHADING CORRECTION MEANS USING A REFERENCE DATA PROCESSING CIRCUIT

BACKGROUND OF THE INVENTION AND RELATED ART STATEMENT

This invention relates to an image reading apparatus for use in a digital copy machine and a facsimile machine.

In the field of an image reading apparatus such as an image scanner for reading a document image with use of a line sensor consisting of densely arranged photoelectric conversion elements (such as CCD: Charge Coupled Device), it is set such that the document image is illuminated by a light source and light reflected from the document image is led to the line sensor via an optic system to obtain a light receiving data. It is common practice to perform a shading correction of the light receiving data to correct its deviation caused by a sensitivity dispersion among each of the photoelectric conversion elements and an illumination dispersion.

This shading correction is to be performed before reading the document image for correcting the light receiving data with use of a white reference data obtained from the photoelectric conversion elements upon receiving reflected lights from a white reference plate and a black reference data obtained from the photoelectric conversion elements when the line sensor is shaded.

However, it is not always possible to perform an optimum shading correction as it is likely the case such as the white reference plate is not in a mint condition or electrical noise maybe picked up, rendering to degrade a reliability of the white reference data and the black reference data. This in turn results in disabling the proper shading correction. In order to cope with this problem, it was proposed an image reading apparatus in Japanese Patent Publication No. 2505906 (hereinafter referred to as JP 2505906) in that plural line data of reading the white reference plate are to be taken to lessen an adverse effect due to the blemish of the white reference plate.

With the image reading apparatus of JP 2505906, when an n-th line data of the white reference data is taken, this n-th line data and the data taken prior to this n-th line data obtained by reading the white reference plate are summed and averaged and the resultant data (averaged value) is stored in a memory. As a result, this described way has at least an advantage in view of the necessary memory capacity over another conventional image reading apparatus in that plural line data are stored and summation of all the data and an average value are calculated.

With the image reading apparatus of JP 2505906, the average value is calculated with the most recent line reading data of the white reference plate and the data stored in the memory that is an average value between the previous data and the data stored before this previous data is taken. Thus the data (x1) read at the beginning is blended with that of the second data (x2) to obtain the average value. This average data is a resultant of the simple mathematical calculation of the two data, i.e., (x1+x2)/2=XI. However, when the next data is taken (let's say x3), then the average value is to be (XI+x3)/2=XII. Then the resultant averaged data (let us call this average a weighted average XII) is further blended with the next data. Accordingly the effect of the first data (x1) gets more and more insignificant to the resultant data as the data is summed and averaged with the following data. The last data (xn) is most significant to the resultant data because of this weighed average method utilized in JP 2505906. Thus let us imagine the case such as a portion of the white reference plate corresponding to the last line data were especially blemished for instance, as the last data (xn) is highly significant to the resultant data then the resultant data could not represent the real character of the white reference plate; it would rather contain a great error.

SUMMARY OF THE INVENTION

It is therefore an object of this invention to solve the problems residing in the conventional image reading apparatuses described in the foregoing section.

It is another object of this invention to provide an image reading apparatus in which a simple flat average value is obtainable upon reading a plurality of lines on the white reference plate while suppressing an increase of memory capacity.

To fulfill the above objects, an image reading apparatus according to this invention comprises:

a) data conversion means for converting analog light receiving data obtained from photoelectric conversion elements arranged in a line to a n-bit digital light receiving data and for outputting the digital light receiving data, where n is a positive integer;

b) shading correction means for correcting the digital light receiving data outputted from the data conversion means upon receiving reflected light from a document image;

c) white reference data control means for receiving a reflected light from a white reference plate by the photoelectric conversion elements at least $2^m$ times (where m is a positive integer smaller than n) before reading the document image;

d) black reference data control means for receiving reflected light via photoelectric conversion elements at least $2^m$ times when the photoelectric conversion elements are shaded before reading the document image;

e) an n-bit memory for white reference data for storing the white reference data in the digital form outputted in response to an operation of the white reference data control means;

f) an n-bit memory for black reference data for storing the black reference data in the digital form outputted in response to an operation of the black reference data control means;

g) a reference data processing circuit for summing one of the reference data corresponding to $2^m$ times line readings in an (n+m) bit region formed by an upper n-bit portion corresponding to n-bits of the n-bit memory for the one of white and black reference data and a lower m-bit portion corresponding to a certain m-bits of the n-bit memory for the other one of white and the black reference data when the one of the reference data is outputted from one of the white reference data control means and the black reference data control means, and for summing the other one of the reference data corresponding to $2^m$ times line readings in an n-bit region formed by a lower m-bit portion corresponding to the certain m-bits of the n-bit memory for the other one of white and black reference data and an upper (n−m) bit region corresponding to (n−m) bits of the n-bit memory of the other one of white and black reference data when the other one of the reference data is outputted from the other one of white reference data control means and the black reference data control means;

wherein the shading correction means corrects the light receiving data in the digital form obtained from the document image with use of one of the reference data that is stored in the n-bit memory region after summation of line readings $2^m$ times and the other one of reference data that is stored in the (n−m)bit region after summation of line reading $2^m$ times.

With the thus constructed apparatus of this invention, before image reading is conducted, $2^m$ of white reference data are obtained with the photoelectric conversion elements arranged in a line by sensing the light reflected upon line reading of white reference plate that is illuminated and similarly $2^m$ of black reference are obtained with the photoelectric conversion elements that are shaded by shading plate upon reading of the white reference plate. Then one of the reference data is sequentially summed up till $2^m$ th data in the (n+m) bit region consisting of an upper n bit section made of n bits of the n-bit memory of one of the reference data and a lower m bit section made of certain m bit portion of the n-bit memory of the other reference data. While the other one of the reference data is sequentially summed up till $2^m$ th data in the n bit region consisting of an upper (n−m) bit section and a lower m bit section wherein the upper (n−m) bit section is made up by (n−m) bits of the n-bit memory of the other reference data and the m bit section is made up by the certain m bits of the same n-bit memory.

As a result, after summation of $2^m$ data is completed, the data stored in the n bit memory of the one of the reference data coincides with the m bit shifted data stored in the (n+m) bit region; in other words, that is $\frac{1}{2}^m \times$(summation of $2^m$ line data) and also is an average value of summation of $2^m$ line data of the one of the reference data. In a similar manner, the data stored in the (n−m) bit section of the n-bit memory for the other reference data coincides with the m bit shifted data stored in the n bit region, that is, the average value of the summation of $2^m$ line data of the other reference data. Thus the average value of the summation of $2^m$ other one of the reference data is found in the (n−m) bit portion of the n bit memory for the other one of the reference data.

These and other objects, features and advantages of the present invention will become more apparent upon reading the following detailed description along with accompanying drawings.

BRIEF DESCRIPTION OF THE DRAWINGS

FIG. 12 A is a schematic diagram showing alternate form of a document feeder unit; and FIG. 12 B is a schematic diagram showing another alternate form of a document feeder unit.

DETAILED DESCRIPTION OF THE PREFERRED EMBODIMENT OF THE INVENTION

Figure 1:
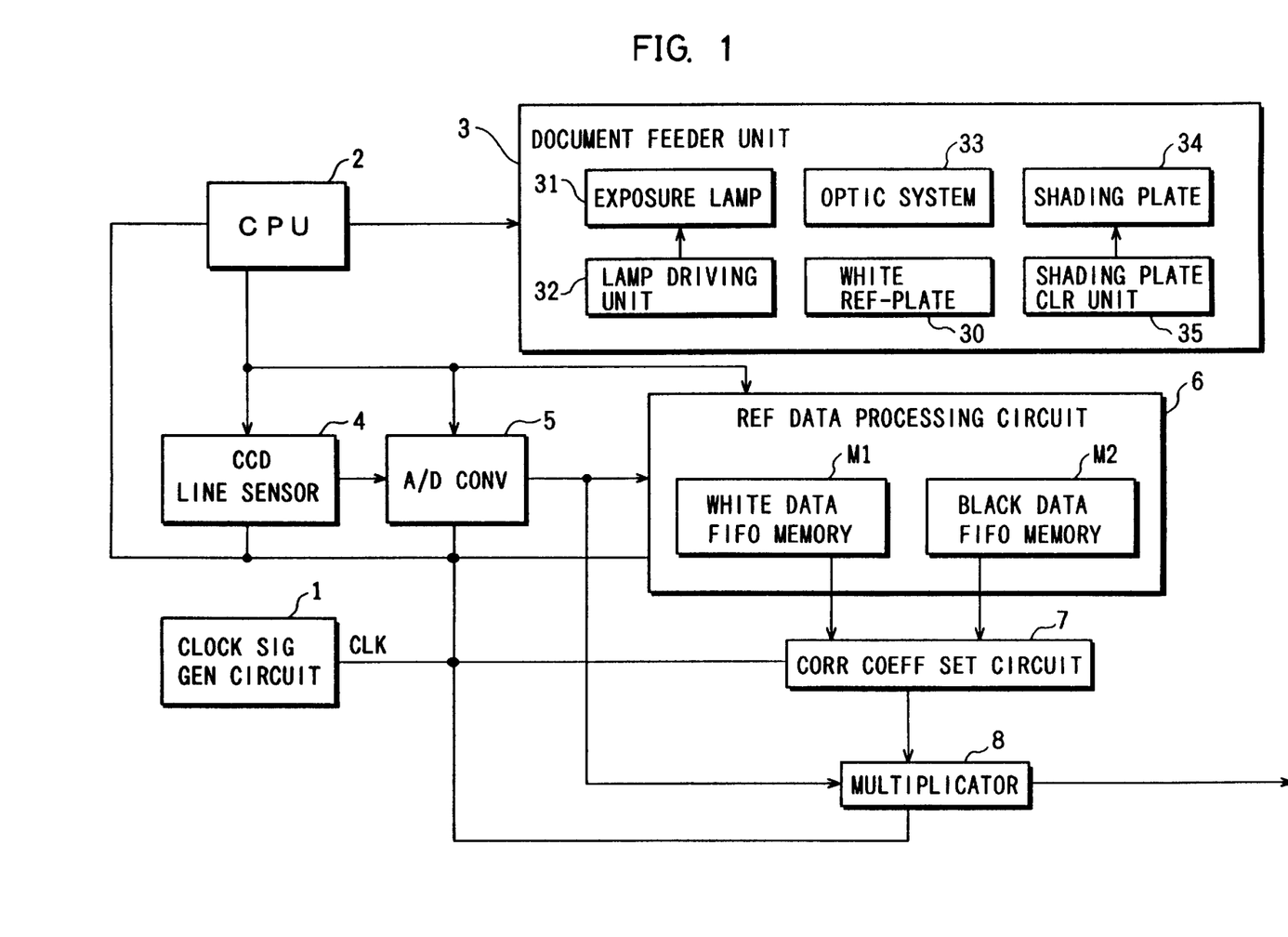
FIG. 1 is a block diagram showing an image reading apparatus as one embodiment of this invention.
Figure 2:
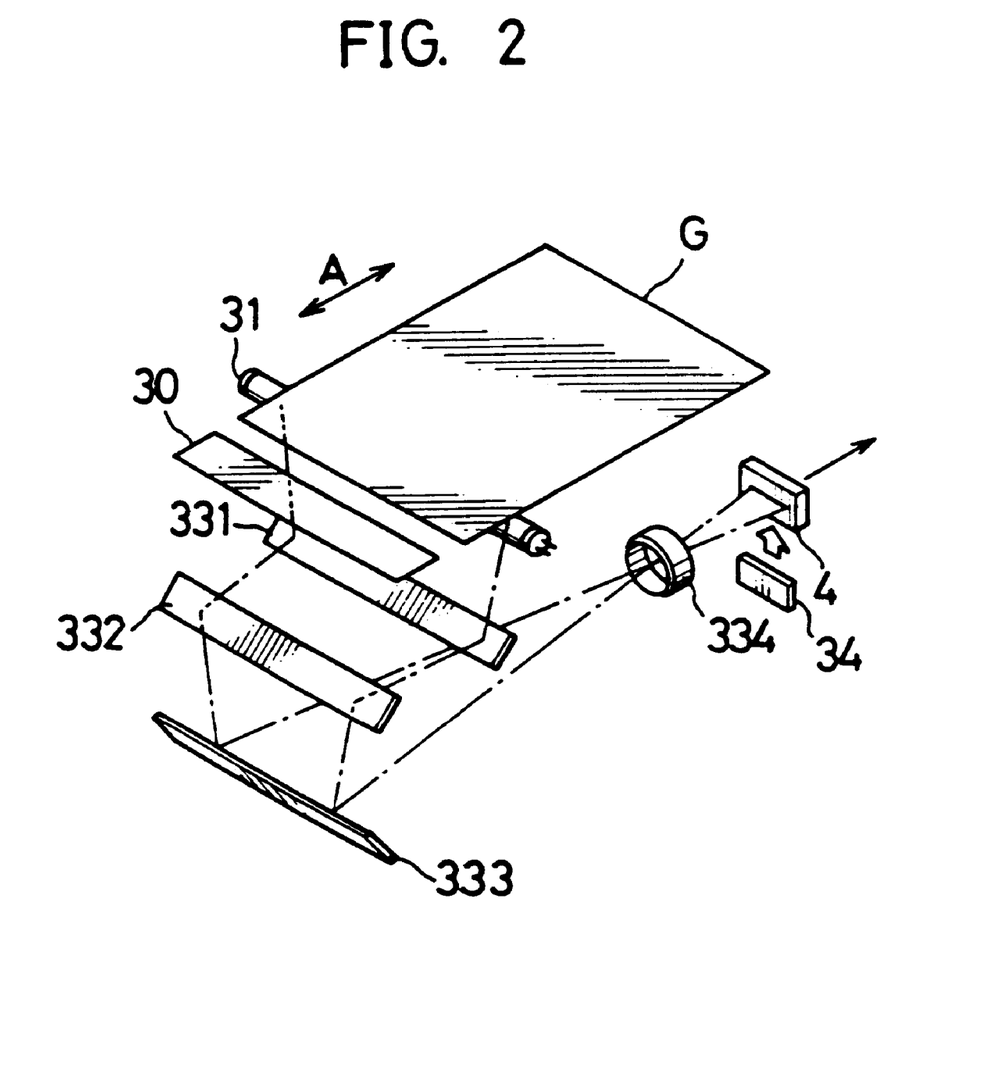
FIG. 2 is a schematic diagram of a document feeder unit according to the one embodiment.

FIG. 1 is a block diagram showing an image reading apparatus according to this invention as its one embodiment. FIG. 2 is a schematic diagram of a document feeder unit of the image reading apparatus.

The image reading apparatus of this invention comprises a clock signal generating circuit 1, a CPU 2, a document feeder unit 3, a CCD line sensor 4, an A/D conversion unit 5, a reference data processing circuit 6, a correction coefficient setting circuit 7 and a multiplication unit 8.

The clock signal generating circuit 1 has a crystal oscillator or a ceramic oscillator for generating a clock signal of a constant frequency to synchronize motions and operations of each unit of the apparatus. The clock signal generating circuit also enables to produce another clock signal such as a horizontal synchronizing signal OHSYN of a certain frequency that is made by proportionally reducing the clock signal for outputting such clock signal as a reference lock signal CLK.

The CPU 2 is to control an operation of each unit of the image reading apparatus and such control includes an output of control signals indicating such as a start of white and black reference data taking and an end of white and black reference data taking and a set of a space of data sampling lines.

The document feeder unit 3 includes a white reference plate 30, an exposure lamp 31, a lamp driving unit 32, an optic system 33, a shading plate 34, a shading plate drive unit 35 and an unillustrated contact glass on which a document G is positioned (shown in FIG. 2).

The white reference plate 30 is used to obtain a white reference data for use in a shading correction and is provided in an are a next to the document G placed on the unillustrated contact glass a s shown in FIG. 2.

An exposure lamp 31 consists of a florescent lamp or a halogen lamp to emit light to the white reference plate 30 and the document G.

A lamp drive unit 32 is to illuminate the exposure lamp 31 and is to move the same along an arrow A (in FIG. 2) to illuminate the entire surface of the document G along the arrow A.

An optical system 33 includes a reflection mirror 331–333 and a focus lens 334 to lead the reflected light from the document G to the CCD line sensor 4 to form an image on its light receiving plane.

A shading plate 34 is to shade the light receiving plane of the CCD line sensor 4 to obtain black reference data for use in a shading correction. The CPU 2 controls operations of a shade plate driving unit 35.

The CCD line sensor 4 consists of plurality of Charge Coupled Devices (photoelectric conversion elements) arranged in a line to output analog voltage signal The A/D converter 5 is to convert the analog voltage signal to an 8 bit digital value. When converting the analog light receiving data to the 8 bit digital light receiving data, a white reference data (described in more details in later) is to be converted to a value close to $(2^8-1)$ whereas a black reference data (described in more details in later) is to be converted to a value close to 0.

The reference data processing circuit 6, the correction coefficient setting circuit 7 and the multiplication unit 8 are to be used for a shading correction for correcting a dispersion of each CCD (photoelectric conversion element) and an illumination deviation of the exposure lamp 31.

The reference data processing circuit 6 includes a FIFO (first in first out) memory M1 for a white reference data and a FIFO memory M2 for a black reference data to obtain a white reference data in accordance with the steps (later described) with use of an output signal of the CCD line sensor 4 due to a reflected light from the white reference plate 30 and store the white reference data in the FIFO memory M1 for the white reference data.

In addition, the reference data processing circuit 6 is to obtain a black reference data in accordance with the steps (described in later) with use of an output signal of the CCD line sensor 4 when the light receiving plane of the CCD line sensor 4 is shaded with the shade plate 34 and store the black reference data in the FIFO memory M2 for the black reference data. The detailed explanation on the structure of the reference data processing unit 6 is described in later.

The correction coefficient setting circuit 7 is to set correction coefficients for use in correction of the outputted voltage signals of the CCD line sensor 4 in response to the reflected light from the document G with the use of the black and the white reference data obtained by the reference data processing circuit 6.

The multiplication unit 8 is for multiplying the outputted voltage signals of the CCD line sensor 4 in response to the light reflected from the document G by the coefficients set by the correction coefficient set circuit 7 to correct the dispersion of each CCD and the deviation of the exposure lamp 31.

Figure 3:
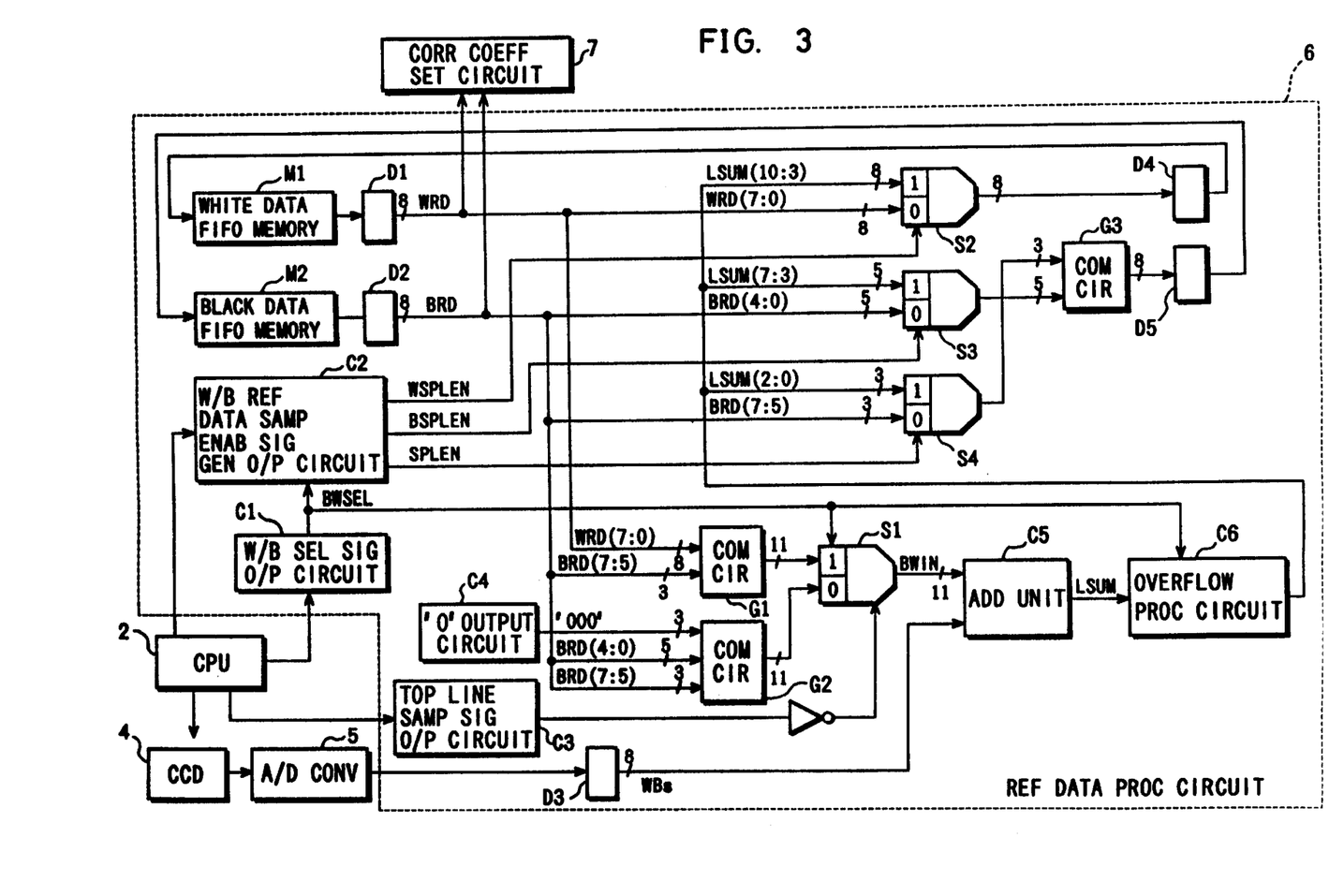
FIG. 3 is a circuit block diagram of a reference data processing circuit.

FIG. 3 is a block circuit diagram of the reference data processing circuit 6.

The reference data processing circuit 6, as a circuit to generate a selection signal for selecting output signals of such as a selector, includes a white/black selection signal output circuit C1, a white/black reference data sampling enabling signal output circuit C2 (hereinafter referred to as "W/B Ref Data Samp Enab Sig O/P Circuit") and a top line sampling signal output circuit C3.

The reference data processing circuit 6, in the order sequentially from upstream along a data flow, includes the FIFO memory M1 for the white reference data, the FIFO memory M2 for the black reference data, "0" output circuit C4, composite circuits G1, G2, a selector S1, an addition unit C5, an overflow processing circuit C6, selectors S2–S4, a composite circuit G3, and D flip flops D1–D5 arranged in specified positions.

The D flip flops D1–D5 each is to latch the respective input data and to output the same at a synchronized timing with the reference clock signal CLK generated by the clock signal generating circuit 1 for adjusting a timing of output of the data.

The white/black selection signal output circuit C1 is to generate the lack/white selection signal BWSEL indicating if either one of the white reference data or the black reference data is to be read and when the read out of the white reference data is set by the CPU 2, then the white/black selection signal generates a signal "1" whereas the read out of the black reference data is set by the CPU 2, then the white/black selection signal generates a signal "0".

Figure 6:
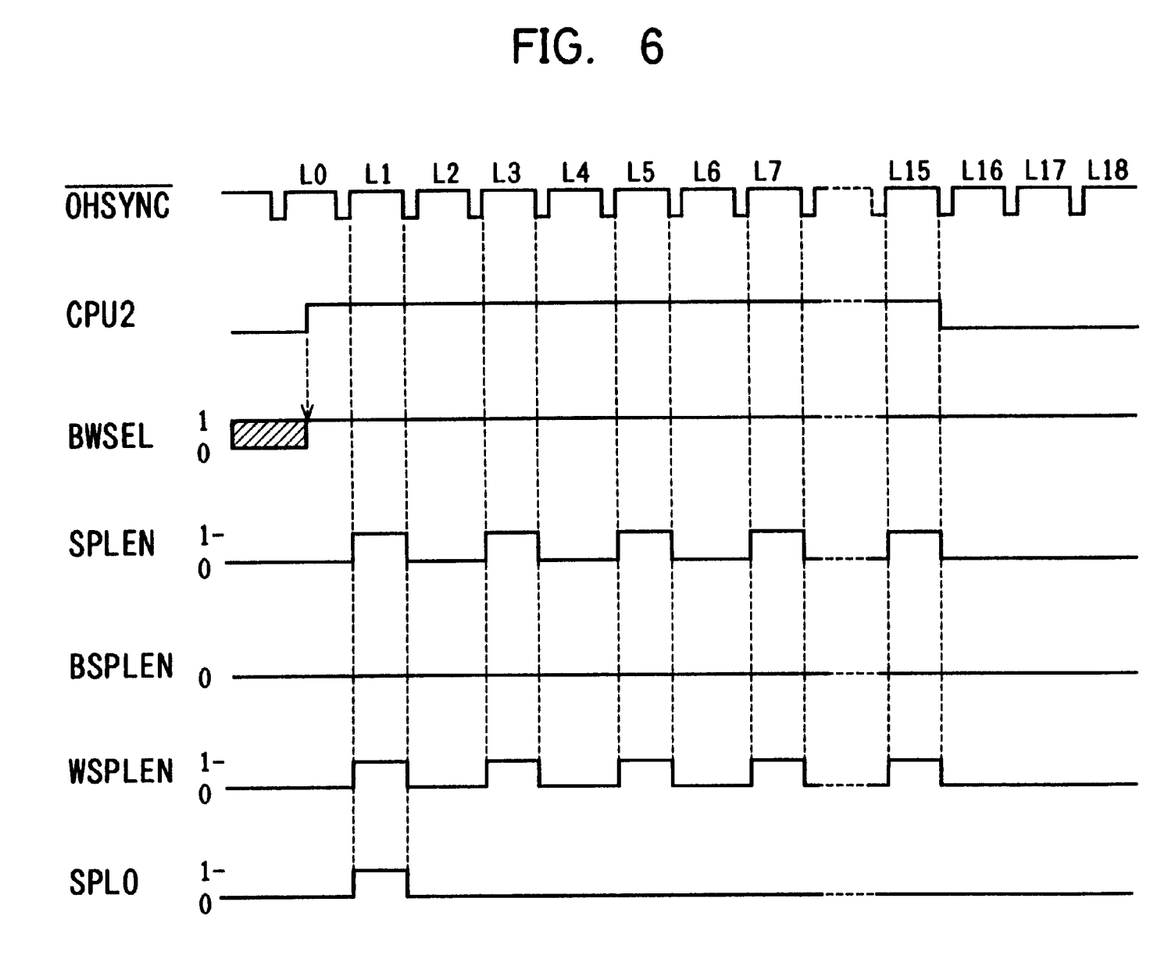
FIG. 6 is a timing chart showing states of relevant signals when the white reference data is being summed up.
Figure 10:
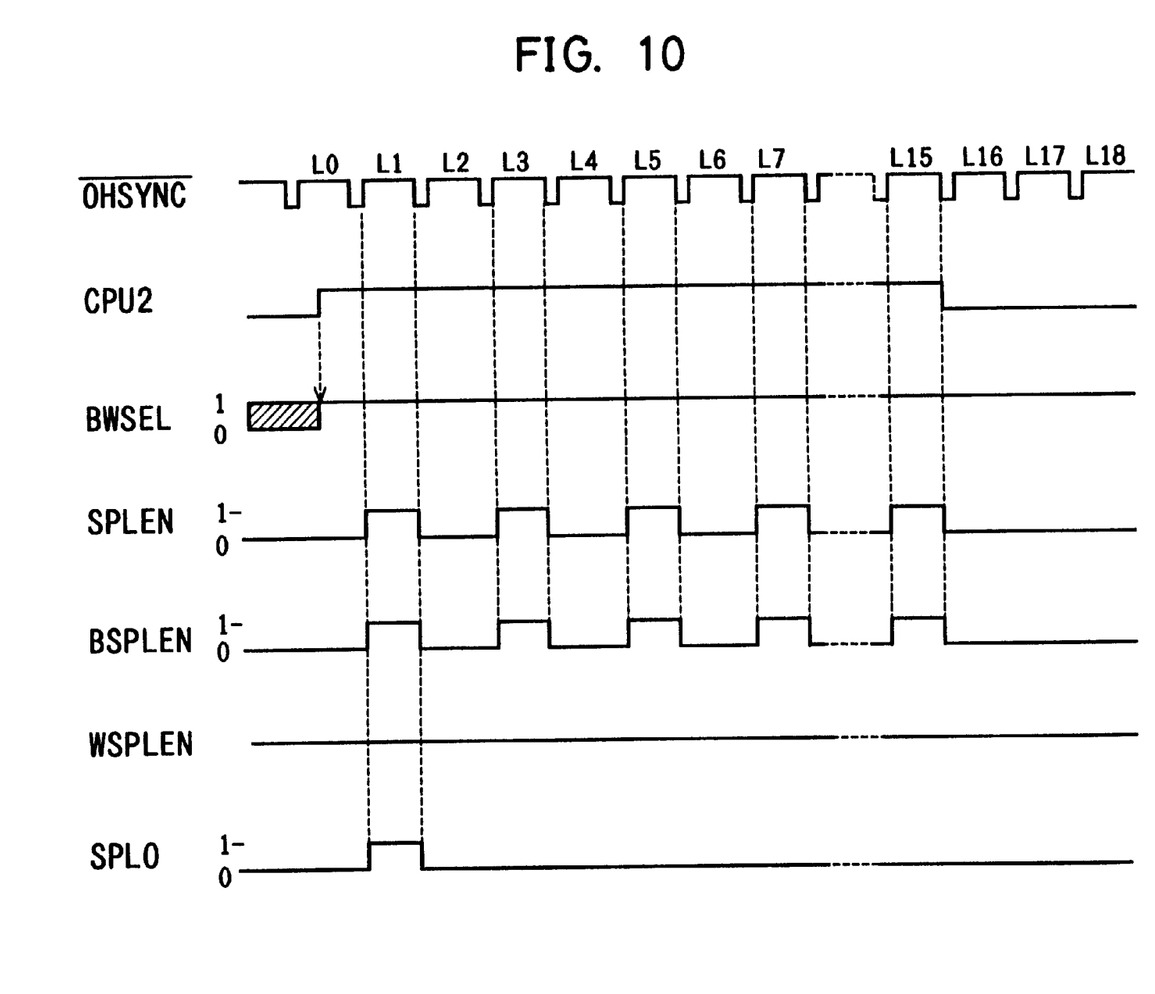
FIG. 10 is a timing chart showing states of relevant signals when the black reference data is being summed up.

The W/B Ref Data Samp Enab Sig O/P Circuit C2 is to output a reference data sampling enabling signal SPLEN in synchronism with a horizontal synchronizing signal OHSYNC generated by the clock signal generating circuit 1 in accordance with the sampling line space set by the CPU 2. In this embodiment, the sampling space is set to be 1 by the CPU 2 and the reference data sampling enabling signals SPLEN is generated in synchronism with the horizontal synchronizing signals OHSYNC L1, L3, L5, . . . , as shown in FIGS. 6 and 10.

The W/B Ref Data Samp Enab Sig O/P Circuit C2 generates a white reference data sampling enabling signal WSPLEN in synchronism with the reference data sampling enabling signal SPLEN when the selection signal BWSEL "1" is outputted by the white/black selection signal output circuit C1. On the contrary, when the selection signal output BWSEL, "0" is outputted by the white/black selection signal output circuit C1, then the W/B Ref Data Samp Enab Sig O/P Circuit C2 generates a black reference data sampling enabling signal BSPLEN in synchronism with the reference data sampling enabling signal SPLEN.

The top line sampling signal output circuit C3 is to output a high level signal in synchronism with the horizontal synchronizing signal OHSYNC when sampling the first line upon receiving the read out signal of either one of white base or the black reference data from the CPU2.

The "0" signal output circuit C4 is to generate three bit 0 data, i.e., "000".

The composite circuit G1 is to produce an 11-bit data, a product of two distinct sections, which are, an upper 8 bit section and a lower 3 bit section. The upper 8 digit section is constituted by an 8 bit data WRD (7:0) stored in the FIFO memory M1 for the white reference data. Whereas the lower 3 bit section is constituted by an upper 3 bit data BRD (7:5) of a 8 bit data BRD stored in the FIFO memory M2 for the black reference data.

The composite circuit G2 is to produce an 11 bit data, a product of three distinctive sections, that are, an upper 3 bit section, a middle 5 bit section and a lower 3 bit section. The upper 3 bit section is constituted by a 3 bit "0" data. The middle 5 bit section is constituted by lower 5 bits BRD (4:0) of the 8 bit data BRD stored in the FIFO memory M2 for the black reference data. Lastly, the lower 3 bit section is constituted by upper 3 bits of the 8 bit data BRD stored in the FIFO memory M2 for the black reference data.

The selector Si is to set the data from the composite circuit G1 as an output data "BWIN" when the selection signal BWSEL "1" is outputted by the white/black selection signal output circuit C1 and to set the data from the composite circuit G2 as an output data "BWIN" when the selection signal BWSEL "0" is outputted by the white/black selection signal output circuit C1. In addition, the selector S1 is to set the output data BWIN "0" when the high level signal indicating the reading of the first line is produced by the top line sampling signal output circuit C3.

The addition unit C5 is to generate a summation data LSUM, i.e., LSUM=WBs+BWIN, where WBs is a digitized data of the black reference data or the white reference data by the A/D converter 5 from the data obtained from the CCD line sensor 4 and BWIN is an output data of the selector S1.

The overflow processing circuit C6 is to set the summation data LSUM to be 2047 in case that the data LSUM exceeds 2047 when the selection signal BWSEL "1" is outputted by the white/black selection signal output circuit C1 and is to set the summation data LSUM to be 255 in case that the data LSUM exceeds 255 when the selection signal BWSEL "0" is outputted by the white/black selection signal output circuit C1.

The selector S2 is to output the upper 8 bits (10:3) of the 11 bit summation data LSUM and store the 8 bit data in the FIFO memory M1 of the white reference data when the white reference data sampling enabling signal WSPLEN is outputted by the W/B Ref Data Samp Enab Sig O/P Circuit C2.

When the white reference data sampling enabling signal WSPLEN is not outputted from the W/B Ref Data Samp Enab Sig O/P Circuit C2, the selector S2, on the other hand, is to output an 8 bit data, WRD (7:0), stored in the FIFO memory M2 and store the 8 bit data in the FIFO memory M1. As a result, the FIFO memory M1 is updated by the new data when the CCD line sensor 4 does not read the white reference data, thus a DRAM can be used for the FIFO memory M1.

The selector S3 is to output middle 5 bits, LSUM(7:3) of the summation data LSUM by exclusion of upper 3 bits and lower 3 bits when the black reference data sampling enabling signal, BSPLEN, is outputted from the W/B Ref Data Samp Enab Sig O/P Circuit C2. Furthermore, when the black reference data sampling enabling signal, BSPLEN, is not outputted from the W/B Ref Data Samp Enab Sig O/P Circuit C2, then the selector S3 is to output the lower 5 bits, BRD(4:0) of the 8 bit data BRD stored in the FIFO memory M2.

The selector S4 is to output the lower 3 bits, LSUM (2:0) of the 11 bit addition data LSUM when the reference data sampling enabling signal SPLEN is outputted from the W/B Ref Data Samp Enab Sig O/P Circuit C2.

Whereas the selector S4 is to output the upper 3 bits, BRD(7:5) of the 8 bit data BRD stored in the FIFO memory M2 when the reference data sampling enabling signal, SPLEN, is not outputted from the W/B Ref Data Samp Enab Sig O/P Circuit C2.

With these selectors, S3 and S4, the FIFO memory M2 is updated with new data when the CCD line sensor does not read the black reference data; thus, a DRAM is used for the FIFO memory M2 as well.

The composite circuit G3 is to produce an 8 bit data; a combination of an upper 3 bit section and a lower 5 bit section, where the upper 5 bit section corresponds to the 5 bit data produced by the selector S3 and the lower 3 bit section corresponds to the 3 bit data produced by the selector S4. And the composite circuit G3 stores such 8 bit data in the FIFO memory M2.

Figure 4:
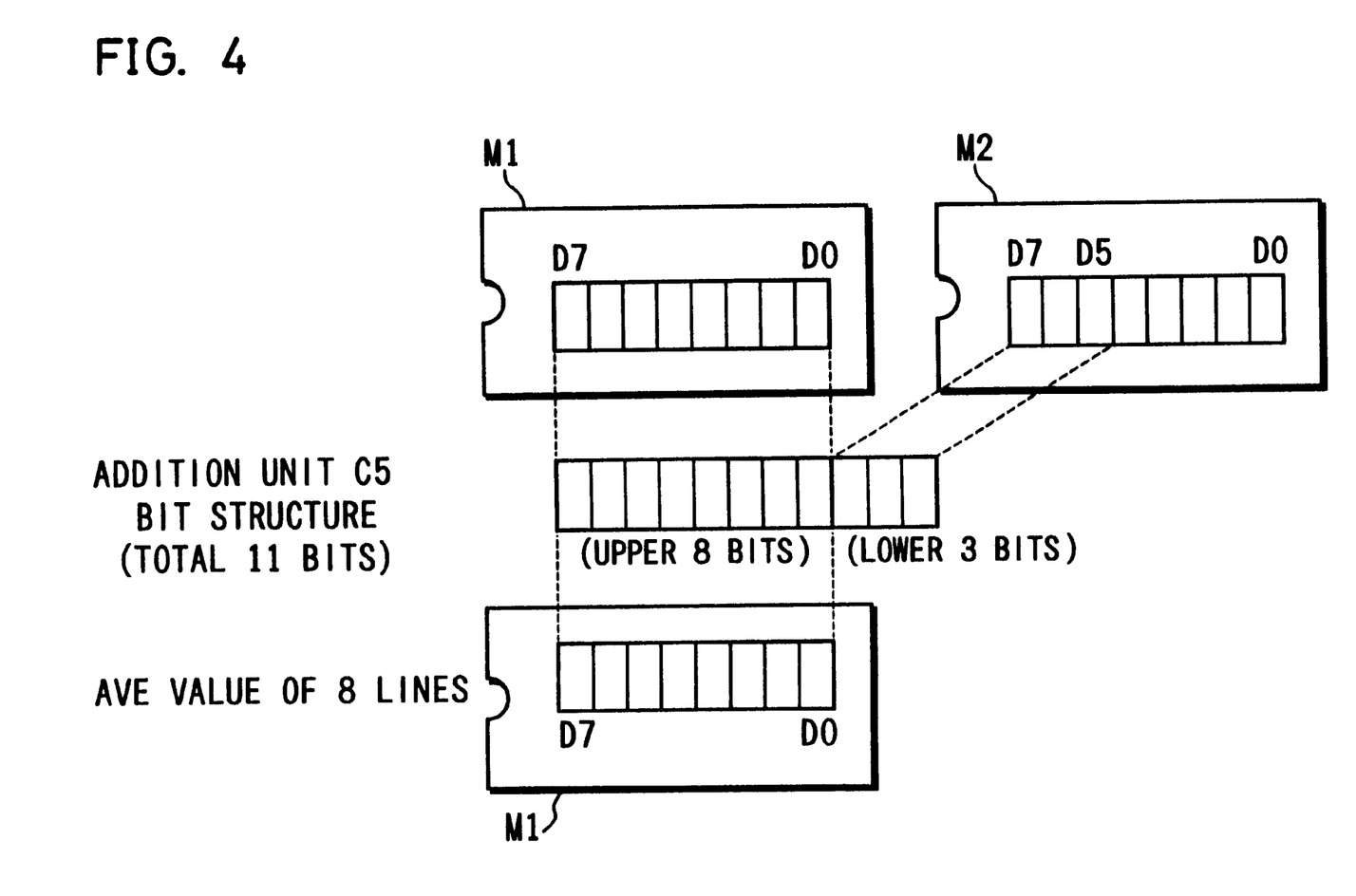
FIG. 4 is an explanatory diagram showing a bit memory structure when a white reference data is summed up.
Figure 5:
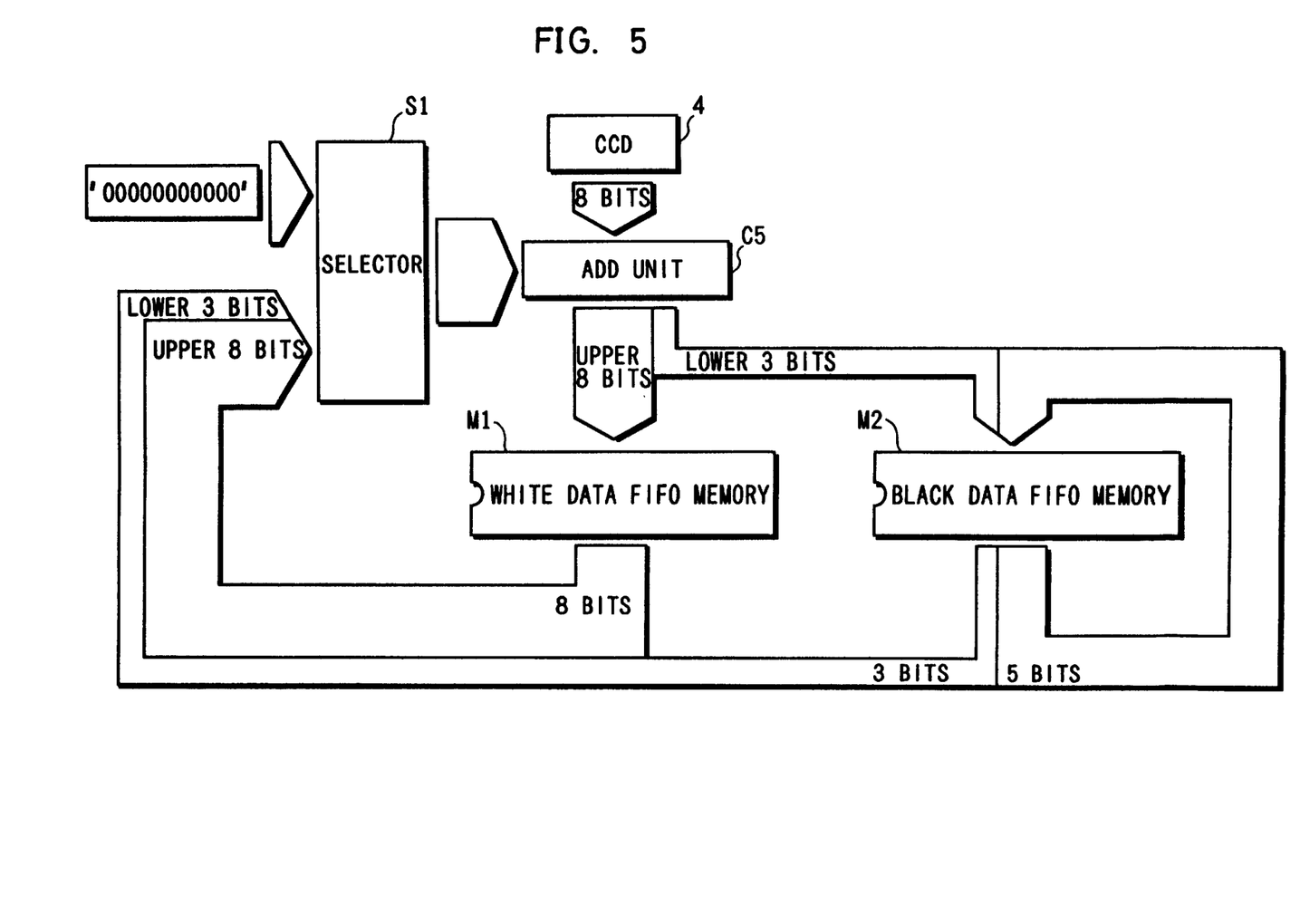
Fig 5 is an explanatory diagram showing a flow of data in an area around FIFO memories M1, M2 when the white reference data is being integrated.
Figure 7:
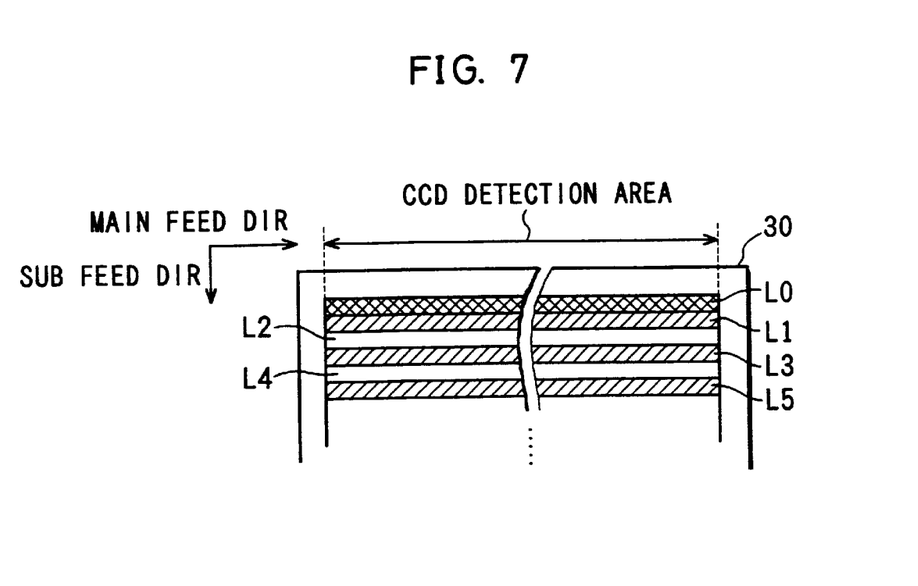
FIG. 7 is an explanatory diagram showing a sampling line (lines) for taking white reference data of a white reference plate.

Next, operations to obtain the white reference data are described along with FIGS. 3 to 7. FIG. 4 is an explanatory diagram showing a bit structure when integrating the white reference data. FIG. 5 is an explanatory diagram showing a data flow around the area of FIFO memories M1 and M2. FIG. 6 is a timing chart indicating the signal state of the each part and unit. And finally FIG. 7 is a diagram showing a sampling line of the white reference data.

When the CPU2 outputs a signal indicating a start of reading of the white reference data, the selection signal, BWSEL, "1" is outputted from the white/black selection signal output circuit C1 and then from the reading of next line L1, the reference data sampling enabling signal, "SPLEN", and the white reference data sampling enabling signal, "WSPELN", are outputted, in synchronism with the horizontal synchronizing signal OHSYNC, from the W/B Ref Data Samp Enab Sig O/P Circuit C2 to begin sampling of white reference data., Thereafter as shown in FIG. 7, data sampling is repeated until eight lines spaced apart from each other by specified sampling space ( set to be one line in this embodiment) are read.

The white reference data WBs obtained at each sampling is summed with the data BWIN read out from the FIFO memory MI by the addition unit C5 and the summed data is stored again in the FIFO memory M1. Specifically, at the beginning of the data sampling, it is not necessarily that the 0 data is stored in the FIFO memory M1, thus the output signal BWIN from the selector S1 at this data sampling on the first line L1 is set "0" with the output signal SPLO from the top line sample signal output circuit C3. Then the read in white reference data BWs and the output signal BWIN, that is 0, are summed up together.

The addition (summation) of 8 bit white reference data corresponding to the readings of eight lines is performed in a 11 bit region, consisting of an upper 8 bit section and a lower 3 bit section. The upper 8 bit section is formed by 8 bits of the FIFO memory M1 and the lower 3 bit section is formed by upper 3 bits of the FIFO memory M2. Generally, the white reference data takes a large value; however, summation of eight of 8 bit white reference data corresponding to the 8 line readings can be performed in the 11 bit region without the summed value exceeding the 11 bit region.

When a summation of whole eight white reference data is completed, the data sampling is halted. It should be noted that when the result of summation LSUM at the addition unit C5 exceeds 2047 by any reasons, the overflow processing circuit C6 sets the LSUM value to be 2047 as the region provided for this calculation is 11 bits.

The summation result LSUM is expressed in 11 bits and the upper 8 bits are stored in the FIFO memory M1. As a result, what is stored in the FIFO memory M1, 8 bit number, is turned out be the number of 11 bit data of summation result being shifted by the order of 3 bits to lower number. In other words, the number stored in the FIFO memory ( 8 bit data) is the value, that is, summation result (11 bit data) of 8 white reference data divided by the number 8. Thus what is given in the FIFO memory M1 equals to the average value of 8 sampling data of line readings.

Accordingly, the upper 8 bit data from the addition unit C5 is read in the FIFO memory M1 and the 8 bit data is read out in upper 8 bit region of the selector S1.

While the white reference data is being taken, the black reference data sampling enabling signal BSPLEN is not issued, the data BRD stored in the FIFO memory M2 from the selectors S3 and S4 is output and this outputted data is once again stored in the FIFO memory M2. Thus the data travels as shown in FIG. 5, the same data is kept stored in the FIFO memory M2.

Figure 8:
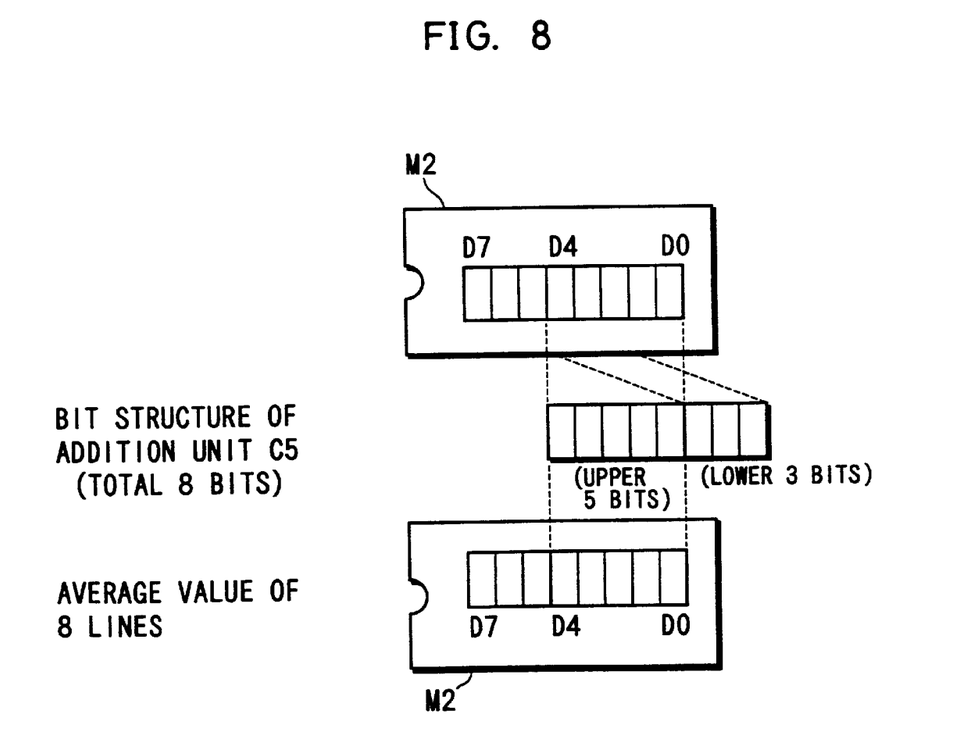
FIG. 8 is an explanatory diagram showing a bit memory structure when a black reference data is summed up.
Figure 9:
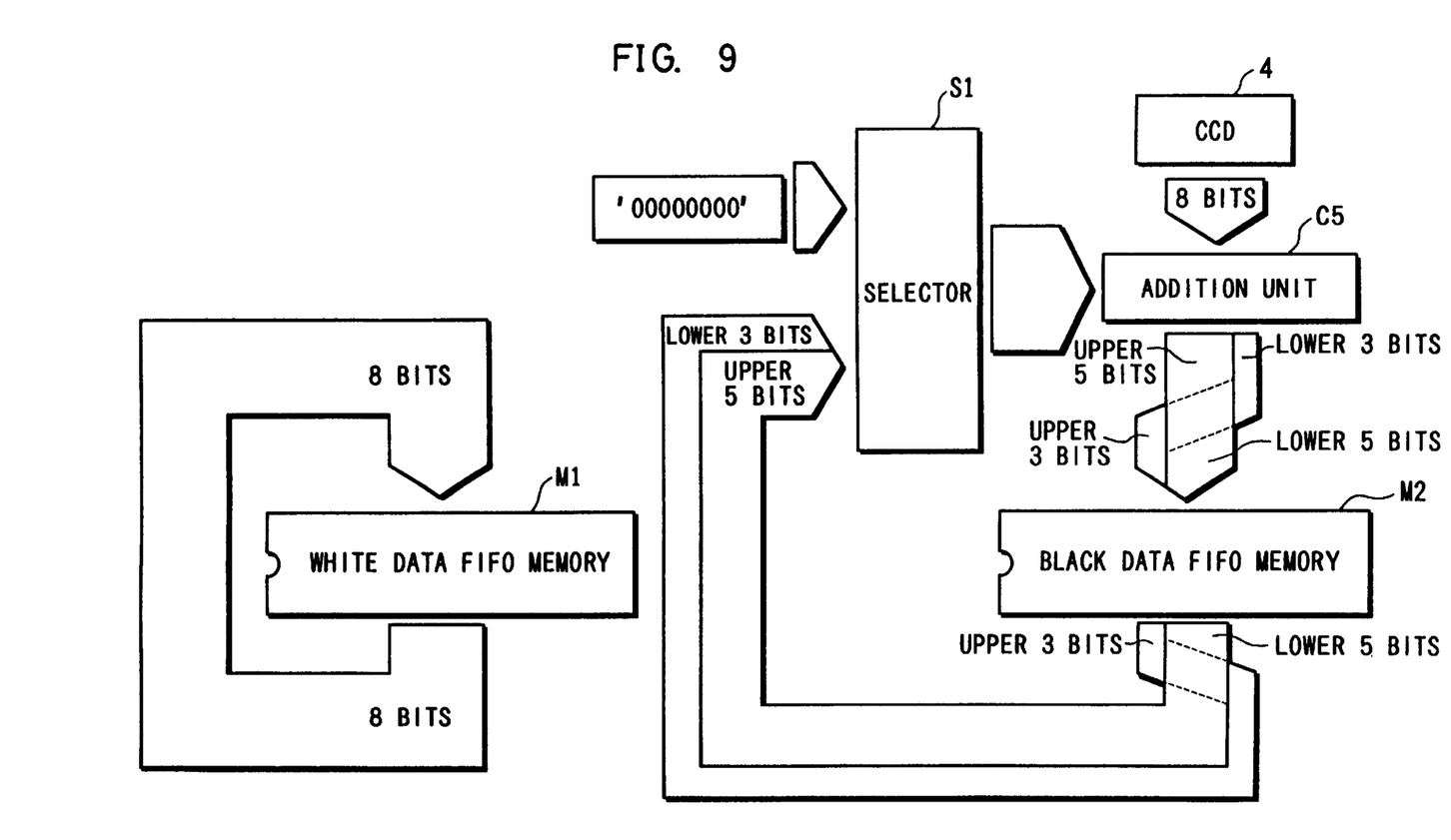
FIG. 9 is an explanatory diagram showing a flow of data in an area around FIFO memories M1, M2 when the black reference data is being integrated.
Figure 11:
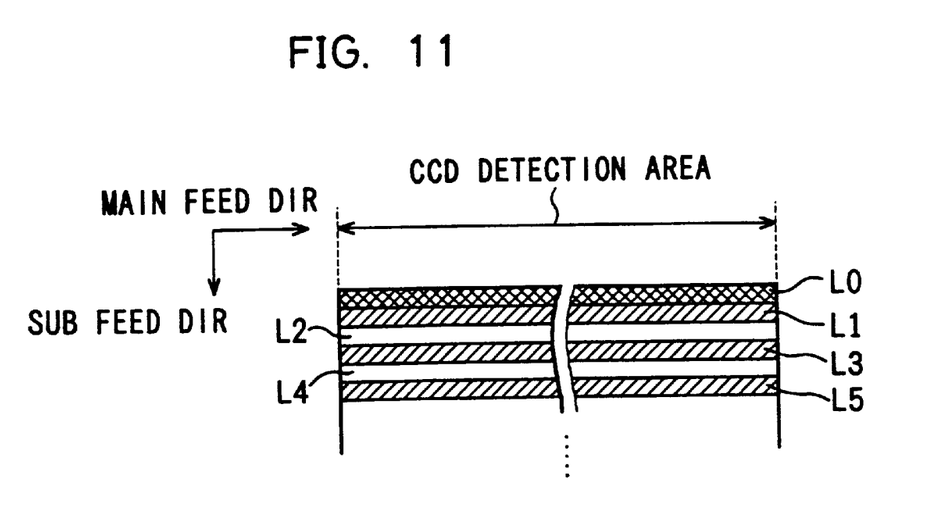
FIG. 11 is an explanatory diagram showing a sampling line (lines) for taking black reference data.

Next operations to obtain the black reference data is described along with FIGS. 3, 8 to 11. FIG. 8 is an explanatory diagram showing bit structure when the black reference data is being integrated. FIG. 9 is an explanatory diagram showing a data flow around the area of FIFO memories M1 and M2. FIG. 10 is a timing chart showing signal state of each part and unit. Finally FIG. 11 is a diagram showing a sampling line of black reference data.

When the CPU 2 issues a read start signal for reading the black reference data, the selection signal "0" is outputted from the white/black selection signal output circuit C1 as shown in FIG. 10. Then from the next line L1, the reference data sampling enabling signal SPLEN and the black reference data sampling enabling signal BSPLEN are, in synchronism with the horizontal synchronizing signal OHSYNC, outputted from the W/B Ref Data Samp Enab Sig O/P Circuit C2 to begin black data sampling.

Then as shown in FIG. 11, the line reading is repeated 8 times, corresponding to eight lines spaced apart from each other by specified dimension (one line in this embodiment).

The black reference data WBs obtained by each data sampling is summed with the data BRD read out of the FIFO memory M2 at the addition unit C5 and once again the summed data is stored in the FIFO memory M2.

At the beginning of the data sampling, it is not necessary the case that the FIFO memory M2 stored a 0 data; therefore, the output signal BWIN of the selector S3 is set 0 with the output data SPLO of the top line sampling signal output circuit C3. Thereafter the black reference data BWs for its first line reading and the output signal BWIN=0, of the selector S3 are summed at the addition unit C5.

As shown in FIG. 8, the addition of the black reference data for eight line readings is performed in an 8 bit region, consisting of an upper 5 bit section and a lower 3 bit section. The upper 5 bit section is formed by the lower 5 bits of FIFO memory M2 and the lower 3 bit section is formed by the upper 3 bits of FIFO memory M2. As the black reference data is supposed to be close to 0 in general, summation of total eight black reference data would not exceed the 8 bit region though eight of 8 bit black reference data are summed up all together.

When the summation of eight black reference data corresponding to the data samplings of 8 lines is completed, then the data sampling is halted. This summation is, as described, performed in the 8 bit region, thus when the summed value exceeds 255 by any reasons, the overflow processing circuit C6 sets summed result LSUM at the addition unit C5 to 255.

This summed result is expressed in the 8 bit region and the upper 5 bits of the data stored in this 8 bit region are stored in the lower 5 bit region of the FIFO memory M2. Accordingly, what we have in the lower 5 bit section of the FIFO memory M2 after the summation of eight of black reference data is what are in the 8 bit region that is being shifted by the order of 3 bit to lower number (i.e., a decimal point is shifted by the order of 3 to the left). In other words, the lower 5 bit section of the FIFO memory M2 now has a number being equal to the one eighth (⅛) of the summation result. Thus as shown in FIG. 8, the 5 bit data stored in the lower 5 bit section of the FIFO memory M2 is the average value of the samplings of 8 line readings. Once again, since the black reference data is supposed to be small, it is highly likely that the average of the black reference data can be expressed in the 5 bit region.

Accordingly, as shown in FIG. 9, the data corresponding to the upper 5 bit region of the addition unit C5 is stored in the lower 5 bit region of the FIFO memory M2 and the data corresponding to the lower 3 bit region of the addition unit C5 is stored in the upper 3 bit region of the FIFO memory M2. Furthermore, the upper 3 bits of the FIFO memory M2 is read out in the lower 3 bit region of the selector S1 and the lower 5 bits of the FIFO memory M2 is read out in the upper 5 bit region of the selector S1.

On the other hand, while the black reference data sampling is carried out, the white reference data sampling enabling signal is not issued, the data WRD in the FIFO memory M1 stored from the selectors S3 and S4 is output and this outputted data is stored once again in the FIFO memory M1. Thus the data travels as shown in FIG. 9, however, the same data is kept in the FIFO memory M1.

In the foregoing embodiment, a 8 bit general purpose memory is used for the FIFO memory M1 and the FIFO memory M2, the simple memory can be equipped at low cost and this attributes to the simplicity and cost effectiveness of the image reading apparatus as a whole.

The 11 bit region, a combination of the upper 8 bit section and the lower 3 bit section, made up with 8 bits of the FIFO memory M1 and the upper 3 bits of the FIFO memory M2 is used for the summation of the white reference data corresponding to eight line readings. Thus normally useless upper 3 bits of the FIFO memory M2 is effectively utilized as the summation of the black reference data corresponding to eight line readings can be done in the lower 5 bit region. Because of addition of this 3 bit region taken from the FIFO memory M2 to the 11 bit region, the overflow of summed data for eight of the white reference data can be effectively prevented. Accordingly, instead of having 11 bit memory for the FIFO memory M1 and 5 bit memory for the FIFO memory M2, as in this embodiment, the 8 bit general purpose memory is used for both FIFO memories M1 and M2.

Furthermore, when summing up the black reference data in 8 bit region; the lower 5 bits of the FIFO memory M2 are read in the 8 bit region and summation is performed in the 8 bit region and then upper 5 bits are brought back to the lower 5 bits of FIFO memory M2. Thus after the summation of the eight black reference data corresponding to eight lines, without performing the division by 8, what is in the lower 5 bit region of the FIFO memory M2 is the average value of the black reference data. Thus it can simplify the memory structure and its associate parts.

Yet furthermore, when summing up the white reference data in the 11 bit region, the upper 8 bits of the FIFO memory M1 are used as an upper 8 bit section of the 11 bit region and the summation is performed in the 11 bit region and then upper 8 bits thereof are brought back into the 8 bit FIFO memory M1. Thus the division step (to obtain the average value) is eliminated thus it can contribute to a simplification of the memory system.

When the white/black reference data is not computed, the data stored in the FIFO memory M1 or the FIFO memory M2 can be read-out and read-in, not only SRAM but DRAM can be used for the FIFO memories M1 and M2.

In the foregoing embodiment, the sampling line space when receiving reflected light for the white reference data and black reference data sampling is set by the CPU 2, thus setting the line space is made easy and simple. When setting the line space to be 0 line, each one of base data sampling can be performed in the short period of time whereas when setting the line space to be a plural lines, such as 4 lines, for instance, the adverse effect derived from the concentration of the blemish in particular area of the white reference plate 30 can be minimized.

This invention is not limited to the form described along with one embodiment; rather it can take several alternate forms as described in the following passage (1) through (5).

(1): When the A/D converter 5 converting the analog light receiving data to an 8 bit digital light receiving data, contrary to the foregoing embodiment, it is possible to convert such that the white reference data is converted to a value close to 0 and the black reference data is to converted to a value close to ($2^8-1$). In this case, the operation process of FIFO memory M1 and FIFO memory M2 are interchanged with respect to the foregoing embodiment such that the black reference data is summed in an 11 bit region and the white reference data is summed in an 8 bit region. In so doing, the same effect will be achieved as in the foregoing embodiment.

(2) Generalization of this invention: The A/D converter 5 may be set to convert the analog voltage signal to an n-bit digital signal (where n is an integer). An n-bit memory may be used for FIFO memories M1 and M2 to perform data sampling of $2^m$ lines (where m is an integer and m<n ).

When the white reference data is outputted, the reference data processing circuit 6 utilizes an (n+m) bit region including an upper n bit section and a lower m bit section where the n bit section is formed by the n bits of the memory M1 and the m bit section is formed by the upper m bit of the memory M2 to perform summation of the white reference data $2^m$ times corresponding to line readings of $2^m$ times. Furthermore, when the black reference data is outputted, the reference data processing circuit 6 utilizes an n-bit region including an upper (n−m) bit section and a lower m bit section where the (n−m) section is formed by the lower (n−m) bits of the memory M2 and the lower m bit section is formed by the upper m bits of the memory M2 to perform summation of the black reference data $2^m$ times corresponding to the line readings of $2^m$ times.

When the selection signal BWSEL=1 is outputted and if the summation result LSUM value exceeds $(2^{(n+m)}-1)$. the overflow processing circuit C6 sets the LSUM value to be $(2^{(n+m)}-1)$. Similarly when the selection signal BWSEL=0 is outputted and if the summation result LSUM value exceeds $2^n-1$, the overflow processing circuit C6 sets the LSUM value to be $(2^n-1)$.

In fact, even when the all the white reference data are the largest possible value of $(2^n-1)$, $2^m$ times of this largest value is less than $(2^{(n+m)}-1)$ as illustrated in the following mathematical expression, thus using the (n+m) bit region certainly is suffice to the summation of the white reference data corresponding to $2^m$ times of line readings.

Ex:

$$(2^n-1) \times 2 = 2^{(n+m)} - 2^m < 2^{(n+m)} - 1$$

Accordingly, the white reference data stored in the n bit memory M1 for the white reference data after finishing the summation of $2^m$ line reading data coincides with the data that is an m bit shifted (to a lower number) data stored in the (n+m) bit data region, that in turn coincides with the data—$\frac{1}{2}^m \times [(n+m)$ bit data stored in the (n+m) bit data region]. As a result, what is in the memory M1 for the white reference data after the summation $2^m$ times is the average value of $2^m$ of the white reference data.

Furthermore, the black reference data stored in the lower (n−m) bit region of the memory M2 for the black reference data after summation of black reference data corresponding to $2^m$ line readings coincides with the data that is a m bit shifted (to a lower number) data stored in the n bit region. The black reference data in the lower (n−m) bit region is in turn coinciding with the data, $\frac{1}{2}^m \times [$ n bit data stored in the n bit region]. Thus what it is in the lower (n−m) bit region of the memory M1 for the black reference data after the summation $2^m$ times is the average value of $2^m$ of the black reference data.

Accordingly, divisional operation or bit shifting operation for obtaining the average values for the white and black reference data becomes unnecessary. Thus this leads to enable a simpler and more convenient shading correction.

(3) In the above section (2), let us illustrate by substituting proper values into "n" and "m".

For instance, 8 for "n" and 2 for "m" as follows:

In this case, when the white reference data is outputted, the reference data processing circuit 6 utilizes a 10 bit region including an upper 8 bit section and a lower 2 bit section where the 8 bit section is formed by the 8 bits of the memory M1 and the 2 bit section is formed by the upper 2 bit of the memory M2 to perform summation of the white reference data four times corresponding to 4 line readings. Furthermore, when the black reference data is outputted, the reference data processing circuit 6 utilizes an 8 bit region including an upper 6 bit section and a lower 2 bit section where the 6 bit section is formed by the lower 6 bits of the memory M2 and the lower 2 bit section is formed by the upper 2 bits of the memory M2 to perform summation of the black reference data four times corresponding to the 4 line readings.

Accordingly, the white reference data stored in the 8 bit memory M1 for the white reference data after finishing the summation of 4 line reading data coincides with the data that is a 2 bit shifted (to a lower number) data stored in the 10 bit data region, that in turn coincides with the data—$\frac{1}{4} \times (10$ bit data stored in the 10 bit data region). As a result, what is in the memory M1 for the white reference data after the summation four times is the average value of four of the white reference data.

Furthermore, the black reference data stored in the lower 6 bit region of the memory M2 for the black reference data after summation of black reference data corresponding to 4 line readings coincides with the data that is a 2 bit shifted (to a lower number) data stored in the 8 bit region. The black reference data in the upper 6 bit section of 8 bit region is in turn coinciding with the data, $\frac{1}{4} \times (8$ bit data stored in the 8 bit region). Thus what it is in the lower 6 bit region of the memory M2 for the black reference data after the summation four times is the average value of four of the black reference data.

Accordingly, divisional operation or bit shifting operation for obtaining the average values of four of the white and black reference data respectively becomes unnecessary. Thus this leads to enable a simpler and more convenient shading correction.

(4) It is possible to alter the arrangement in the above section (2) such as when the white reference data is outputted, the reference data processing circuit 6 utilizes an (n+m) bit region including an upper n bit section and a lower m bit section where the n bit section is formed by the n bits of the memory M1 and the m bit section is formed by the lower m bit of the memory M2 to perform summation of the white reference data $2^m$ times corresponding to $2^m$ times of line readings. Furthermore, when the black reference data is outputted, the reference data processing circuit 6 utilizes an n-bit region including an upper (n−m) bit section and a lower m bit section where the (n−m) bit section is formed by the upper (n−m) bits of the memory M2 and the lower m bit section is formed by the lower m bits of the memory M2 to perform summation of the black reference data $2^m$ times corresponding to the $2^m$ times of line readings.

Accordingly, arbitrary m bits of black reference data is used as a lower m bits of the addition unit C5 and the same effects as of the arrangements described in the foregoing paragraphs can be achieved.

Figure 12A:
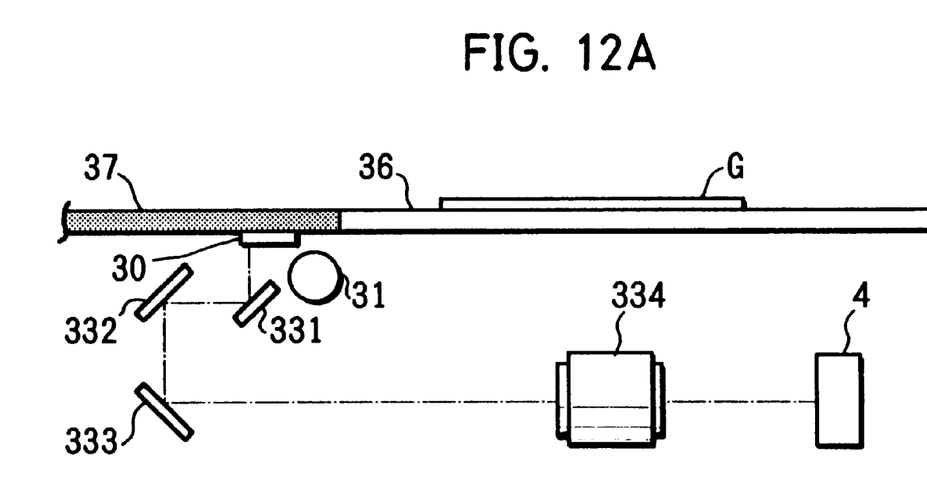
Figure 12B:
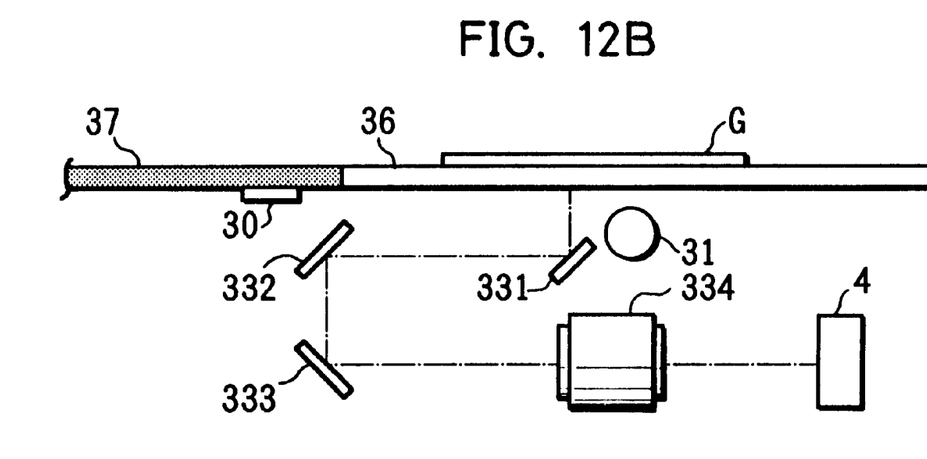

(5) Foregoing embodiments are intended to use the shading plate 34 in the arrangement shown in FIG. 2; however, the shading plate can be used in the arrangements shown in FIGS. 12A and 12B. The same numerals as in FIG. 2 are used to indicate the same elements in FIGS. 12A and 12B.

In this arrangement, a cover 37 made of non-transparent shading member is arranged in proximity to the transparent contact glass 36 on which the document is mounted. A white reference plate 30 is provided on this cover 37.

Referring to FIG. 12A, the exposure lamp 31, and reflection mirrors 331–333 are arranged such as to oppose the cover 37 at their respective home positions. By this arrangement, when they are in their respective home positions and the exposure lamp 31 is turned off, it is set that no lights travel to the CCD line sensor 4.

Thus when the exposure lamp 31 and the reflection mirrors 331–333 are in off state, they are arranged in their respective home position as shown in FIG. 12A. Then when the operation is initiated, these elements, the exposure lamp 31, and the reflection mirrors 331–333 are kept at their respective home positions and the exposure lamp 31 is maintained in off-state to obtain the black reference data.

After completion of data readings of black reference data, then the exposure lamp 31 and the reflection mirrors 331–333 are all moved to the position where the exposure lamp 31 is oriented to the white reference plate 30 to obtain the white reference data. Thereafter the exposure lamp 31 and the reflection mirrors 331–333 are moved as shown in FIG. 12B to read the image on the document G.

With this arrangement, the shading plate 34 and the shading plate driving unit 35 are voided thus it leads to a simpler construction without sacrificing the benefits obtained with the foregoing embodiments.

Although the present invention has been fully described by way of examples with reference to the accompanied drawings, it is to be understood that various changes and modifications will be apparent to those skilled in the art. Therefore, unless otherwise such changes and modifications depart from the scope of this invention, they should be constructed as being included therein.

What is claimed is:

1. An image reading apparatus comprising:
    a) data conversion means for converting analog light receiving data obtained from photoelectric conversion elements arranged in a line to an n-bit digital light receiving data and for outputting the digital light receiving data, where n is a positive integer;
    b) shading correction means for correcting the digital light receiving data outputted from the data conversion means upon receiving reflected light from a document image;
    c) white reference data control means for receiving a reflected light from a white reference plate by the photoelectric conversion elements at least $2^m$ times— where m is a positive integer smaller than n —before reading the document image;
    d) black reference data control means for receiving reflected light via photoelectric conversion elements at least $2^m$ a times when the photoelectric conversion elements are shaded before reading the document image;
    e) an n-bit memory for white reference data for storing the white reference data in the digital form outputted in response to an operation of the white reference data control means;
    f) an n-bit memory for black reference data for storing the black reference data in the digital form outputted in response to an operation of the black reference data control means;
    g) a reference data processing circuit for summing one of the reference data corresponding to $2^m$ times line readings in an (n+m) bit region formed by
        an upper n-bit portion corresponding to n-bits of the n-bit memory for the one of white and black reference data and
        a lower m-bit portion corresponding to certain m-bits of the n-bit memory for the other one of white and the black reference data when the one of the reference data is outputted from one of the white reference data control means and the black reference data control means, and
    for summing the other one of the reference data corresponding to $2^m$ times line readings in an n-bit region formed by
        a lower m-bit portion corresponding to the certain m-bits of the n-bit memory for the other one of white and black reference data and
        an upper (n−m)-bit region corresponding to (n−m)bits of the n-bit memory of the other one of white and black reference data when the other one of the reference data is outputted from the other one of white reference data control means and the black reference data control means;
    wherein the shading correction means corrects the light receiving data in the digital form obtained from the document image with use of one of the reference data that is stored in the n-bit memory for the one of the reference data after summation of line readings $2^m$ times and the other one of reference data that is stored in the (n−m)bit region of the n-bit memory for the other one of the reference data after summation of line reading $2^m$ times.

2. The image reading apparatus of claim 1, wherein the conversion means is set such that the white reference data is close to a value of $(2^n-1)$ and the black reference data is close to 0 when converting the analog light receiving data to the n-bit digital light receiving data,
    the one of the reference data is the white reference data and the other one of the reference data is the black reference data, and
    said memory for the one of white and black reference data is the white reference data memory and said memory for the other one of white and black reference data is the black reference data memory.

3. The image reading apparatus of claim 1, wherein the conversion means is set such that the black reference data is close to a value of $(2^n-1)$ and the white reference data is close to 0 when converting the analog light receiving data to the n-bit digital light receiving data,
    the one of the reference data is the black reference data and the other one of the reference data is the white reference data, and
    said memory for the one of white and black reference data is the black reference data memory and said memory for the other one of white and black reference data is the white reference data memory.

4. The image reading apparatus of claim 1, wherein the reference data processing circuit including:
    an addition unit for summing the outputted one of the reference data and the data stored in the (n+m) bit region line by line and for storing the resultant data in the (n+m) bit region and for summing the outputted other one of the reference data and the data stored in the n-bit data region line by line and for storing the resultant data in the n-bit data region; and
    a top line signal output circuit for replacing the data in the (n+m) bit region with a 0 datum before summation with the outputted one of the reference data when the outputted one of the reference data corresponding to the reading of a first line, and for replacing the data in n-bit data region (memory) with a 0 datum before summation with the outputted other one of the reference data when the outputted other one of the reference data corresponding to a reading of a first line.

5. The image reading apparatus of claim 4, wherein the reference data processing circuit includes an overflow processing circuit for comparing the resultant data summed by the addition unit with a predetermined value and for replacing the resultant data with the predetermined value when the resultant data exceeds the predetermined value and the overflow processing circuit sets the predetermined value to $(2^{n+m}-1)$ when in the summation of the one of the reference data and sets the predetermined value to $(2^n-1)$ when in the summation of the other one of the reference data.

6. The image reading apparatus of claim 1, wherein the integers n and m are set such as to comply with the following mathematical expression:

$n \geq 2^m$.

7. The image reading apparatus of claim 6, wherein the integer n is 8 and the integer m is 3.

8. The image reading apparatus of claim 1, further comprising line space setting means for setting a space of the sampling lines when the light is received by the white reference data control means and the black reference data control means.

* * * * *